July 29, 1958

S. M. PAULSEN 2,845,183

PIE RACK

Filed June 29, 1954

INVENTOR
*S.M. Paulsen*

BY *Arthur H. Sturges*

ATTORNEY

July 29, 1958 S. M. PAULSEN 2,845,183
PIE RACK

Filed June 29, 1954 2 Sheets-Sheet 2

INVENTOR.
S. M. Paulsen
BY Arthur H. Sturges.
Attorney

United States Patent Office 2,845,183
Patented July 29, 1958

2,845,183

PIE RACK

Sidney M. Paulsen, Minden, Nebr.

Application June 29, 1954, Serial No. 440,122

3 Claims. (Cl. 211—41)

This invention relates to carriers for bakery goods and particularly pies wherein a plurality of pies are carried from a truck into a store and placed upon a counter or the like for display, and in particular a vertically disposed rack having means for removably supporting a plurality of pie plate holding rings in spaced relation therein whereby all pies in the rack are adapted to be displayed and wherein each pie is adapted to be independently removed and replaced.

The invention also includes a flexible transparent cover into which the rack is adapted to be placed so that with the upper end of the cover drawn together the pies are protected from the air and also from dust and the like particularly as they are carried from a truck into a store.

The purpose of this invention is to provide a pie rack in which pies may be transported from a bakery to a store in a truck, carried from the truck into the store, and displayed in the store without the individual pies being handled between the bakery and a customer.

Pies are carried on open racks in box-like containers and upon arriving at a store the driver of the truck carrying the pies selects pies from different containers and carries a container with pies therein through air laden with dust and the like, and, in the store, removes the pies from the container, placing the pies upon shelves in display cases or the like. By this means the pies are subjected to disease germs in the air between the truck and store and the continuous handling of the pies breaks the crust at the edges and destroys the pleasing appearance or appeal of the pies.

Furthermore, pies remaining in open show cases dry rapidly and such pies are also subjected to dust and the like.

With these thoughts in mind this invention contemplates a vertically disposed frame having spaced rods on opposite sides with vertically spaced cross bars extended across the rods, and with pie plate holding rings mounted on the cross bars whereby with the rods formed to provide a handle at the upper end and with the rack covered with a transparent cover pies may be individually supported and protected from air, dust, and the like.

The object of this invention is, therefore, to provide a rack for carrying pies from a truck into a store in which the pies remain in the rack from the time they leave the bakery until they are selected by a customer and in which the pies are protected from air, dust, and the like in transit and until they are removed from the rack and wrapped for a customer.

Another object of the invention is to provide a rack for holding pies in plates in which rings for holding the pie plates are individually retained in the rack by clasps meshing with elements of the rack.

Another important object of the invention is to provide a pie rack having a transparent cover in which the cover is adapted to be opened for removing a pie, and is also adapted to be returned to the closed position after a pie is removed so that pies remaining in the rack are protected thereby.

A further object of the invention is to provide pie supporting elements whereby pies are adapted to be placed in and removed from a rack without the crust or other portions of the pies coming in contact with the hands of a person handling the pies.

A still further object of the invention is to provide a pie supporting and carrying rack that is adapted to retain pies in spaced relation upon a counter or the like in which the rack with pies therein is enclosed in a transparent cover and in which the device is of a simple and economical construction.

With these and other objects and advantages in view the invention embodies oppositely positioned pairs of vertically disposed rods, the lower ends of which are connected to provide a supporting base and the upper ends being formed to provide a handle, and said rods being connected at intermediate points with pie plate frame supporting cross rods, rings having clips or clasps positioned to coact with the cross rods for removably supporting pies in the rack, the lowermost of said rings having supporting brackets at the sides, and a transparent cover having a clasp for securing an open end closed until it is desired to remove pies therefrom.

Other features and advantages of the invention will appear from the following description taken in connection with the drawings, wherein.

Figure 1:
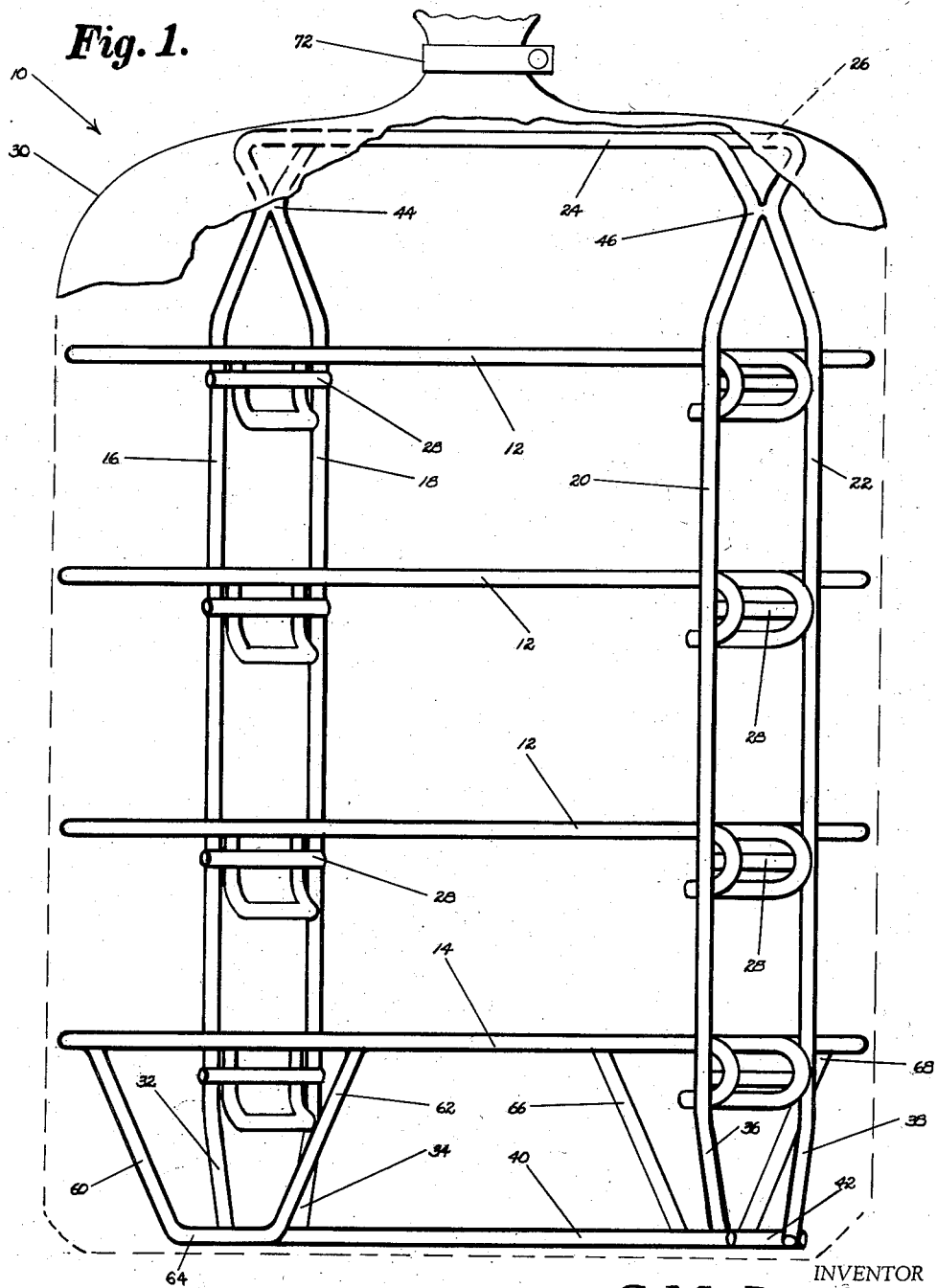
Figure 1 is a side elevational view of the improved pie rack with the rack turned slightly so that parts are shown in perspective, and with part of a transparent covering member broken away and part thereof shown in broken lines.
Figure 2:
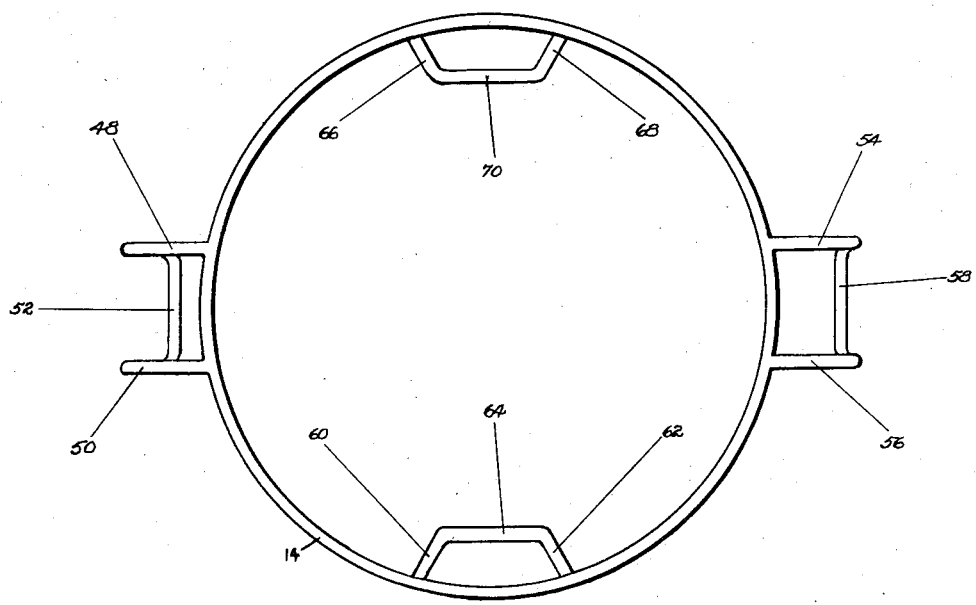
Figure 2 is a plan view of a pie plate supporting ring positioned at the lower end of the rack, the ring being provided with supporting brackets.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a pie plate receiving ring adapted to be positioned in the upper and intermediate parts of the rack, numeral 14 a lower ring for use in the base of the rack, numerals 16 and 18 spaced vertically positioned rods at one side of the rack, numerals 20 and 22 similar vertically disposed rods positioned at the opposite side of the rack, numerals 24 and 26 horizontally disposed section of the rods providing a handle at the upper end of the rack, numeral 28 cross bars extended between the pairs of rods at the sides of the rack, and numeral 30 a cover of transparent material adapted to be positioned over the rack.

The lower ends of the rods 16 and 18 are provided with inwardly extended sections 32 and 34 and the rods 20 and 22 are formed with similar sections, as indicated by the numerals 36 and 38, and, as shown in Figure 1, the lower ends of the sections 32 and 36 are connected with a horizontally disposed bar 40, and the lower ends of the sections 34 and 38 are connected with a similar bar 42, which is parallel to the bar 40.

The upper ends of the rods 16 and 18 extend inwardly to a meeting point 44, at which point the rods are secured together by welding, brazing, or the like, and similar sections on the upper ends of the rods 20 and 22 are secured together in a similar manner, as shown at the point 46. From the points 44 and 46 the rods extend outwardly to support the handle sections 24 and 26.

Figure 3:
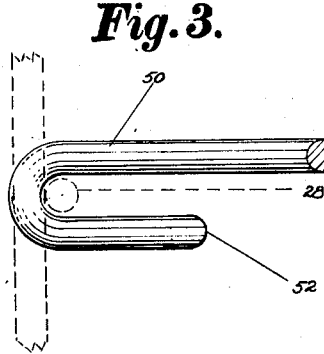
Figure 3 is a detail, with the parts shown on an enlarged scale, illustrating a supporting clip with which one side of the pie plate carrying rings is retained on a cross bar of the rack.

The rings 12 and 14 are provided, at one of the sides thereof, with hook-like clips that extend over the cross bars 28, as shown in Figure 3, the clips being formed with side members 48 and 50 which are secured to the rings, such as by welding, and the side members are connected with cross members 52.

Figure 4:
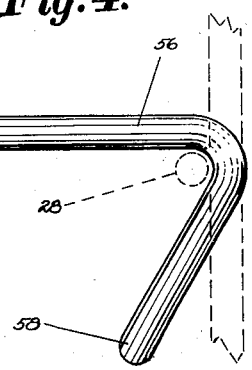
Figure 4 is a similar view, also on an enlarged scale, showing a latching clip positioned on the opposite side of the ring, also for retaining the pie plate carrying rings on cross bars of the rack.

The rings are also provided with latching clips at the opposite sides which are formed as shown in Figure 4 with side bars 54 and 56 connected at the ends with a cross bar 58, the side bars being secured, such as by welding, to the rings, and the ends thereof being extended downwardly to facilitate snapping the clips over the cross bars, as shown in Figure 4. The hook-like and latching clips include spaced parallel rods 48 and 50 of the hook-like clips and 54 and 56 of the latching clips, and the rods extend from opposite sides of the rings and in planes extended through the elements of the rings, the rods being bent upon themselves providing upper and lower arms and the lower arms of the hook-like clips being parallel to the upper arms providing U-shaped elements. The lower arms of the latching clips are positioned at an angle slightly less than a right angle to the upper arms, and said lower arms of the hook-like and latching clips are connected with cross bars. By this means the vertically disposed rods may be pressed inwardly to release the latching clips and with these clips released the clips on the opposie side of the rack are readily removed from the cross bars.

In addition to the holding and latching clips the lower ring 14 is provided with oppositely disposed brackets, the bracket at one side having downwardly converging bars 60 and 62 connected at the lower ends with a cross bar 64, and the bracket at the opposite side having similar downwardly converging bars 66 and 68 connected by a cross bar 70.

With the lower ring provided with the brackets at the sides supporting means is provided whereby the rods 16, 18, 20, and 22 will be retained in an upright position so that the rack is self-supporting and will stand upright. At the same time the ring or frame 14 is also adapted to be removed and replaced with a pie therein.

The cover 30 is preferably formed of a suitable transparent plastic material, and the upper open end is adapted to be gathered together and sealed with a clamp or strap 72, the ends of which may be held with a snap fastener or the like.

By this means a pie rack is provided with which pies and the like may be carried from a bakery to a truck, stored in the truck, and carried from the truck to a store or restaurant without the pies being handled by hand and without the pies being subjected to air, dust, and the like. Pie plates or tins with pies therein are placed in the rings 12 and 14 and the rings hooked and latched to the cross bars so that it is impossible for the pies to slide back and forth in the carrier or container. With the transparent cover in position the pies are displayed without handling and when a customer selects a pie it is removed by pressing inwardly on the rods 16 and 18 to release the latching clip and with the latching clip released the hook-line clip at the opposite side will readily slide from the cross bar. The pie, pie plates or tin, and ring are, therefore, removed as a unit, and the cover may be removed or turned downwardly as pies are removed from the rack, and returned to the position shown in Figure 1, after the pie is removed.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts, such as come within the purview of the invention claimed, may be resorted to, in actual practice, if desired.

Having now described the invention that which is claimed to be new and desired to be procured by Letters Patent, is:

1. In a pie carrying rack, the combination which comprises oppositely positioned pairs of vertically disposed rods, said rods being connected at their upper ends with transversely disposed bars positioned to provide a handle and at their lower ends with transversely disposed bars positioned to retain the pairs of rods in vertically disposed positions, the transversely disposed bars connecting the upper and lower ends of the pairs of rods being integral with said rods, vertically spaced horizontally positioned cross bars connecting the rods of each of said pairs, a plurality of upper and intermediate pie plate receiving rings having hook-like clips at one side and inwardly inclined latching clips on the opposite side with the clips including spaced parallel rods extended from opposite sides of the ring and positioned in a plane extended through the elements of the ring, said rods being bent upon themselves providing upper and lower arms and the lower arms of the hook-like clips being parallel to the upper arms and the lower arms of the latching clips being positioned at an angle slightly less than a right angle to the upper arms, the extended ends of the lower arms being connected with cross bars, and the clips being positioned to coact with the cross bars for retaining the rings in position in the rack, and a lower ring also having hook-like and inwardly inclined latching clips thereon positioned to coact with the lower cross bars for retaining the lower ring in position in the rack and said lower ring also having depending brackets at the sides for assisting in supporting the rack.

2. A pie plate carrier comprising a ring, supporting clips including spaced parallel rods extended from opposite sides of the ring and positioned in a plane in which the body of the ring is positioned, said rods being bent upon themselves providing upper and lower arms, the lower arms of the clip on one side of the ring being parallel to the upper arms providing a U-shaped clip, and the lower arms of the clip on the opposite side of the ring being positioned at an angle slightly less than a right angle to the upper arms, the extended ends of the lower arms being connected with cross bars.

3. A pie plate carrier comprising a ring, supporting clips integral with the ring, said clips including spaced parallel rods extending from opposite sides of the ring and positioned in a plane in which the ring is positioned, said rods being bent upon themselves providing upper and lower arms and the lower arms of the clip on one side of the ring being parallel to the upper arms providing U-shaped sides of the clip, the lower arms of the clip on the opposite side of the ring being positioned at an angle slightly less than a right angle to the upper arms providing a latching clip, the extended ends of the lower arms being connected with cross bars, said ring having U-shaped brackets depending therefrom and said brackets being positioned substantially midway between the clips.

References Cited in the file of this patent

UNITED STATES PATENTS

| | | |
|---|---|---|
| 152,550 | Collins | June 30, 1874 |
| 2,107,828 | Krantz | Feb. 8, 1938 |
| 2,251,600 | Pollock | Aug. 5, 1941 |
| 2,534,380 | Schwartzmann | Dec. 19, 1950 |
| 2,600,191 | Beach | June 10, 1952 |

FOREIGN PATENTS

| | | |
|---|---|---|
| 325,066 | Great Britain | Feb. 13, 1930 |